Nov. 20, 1934.  G. LUFKIN ET AL  1,981,625
GLASS MELTING FURNACE
Filed Aug. 17, 1933  2 Sheets-Sheet 1
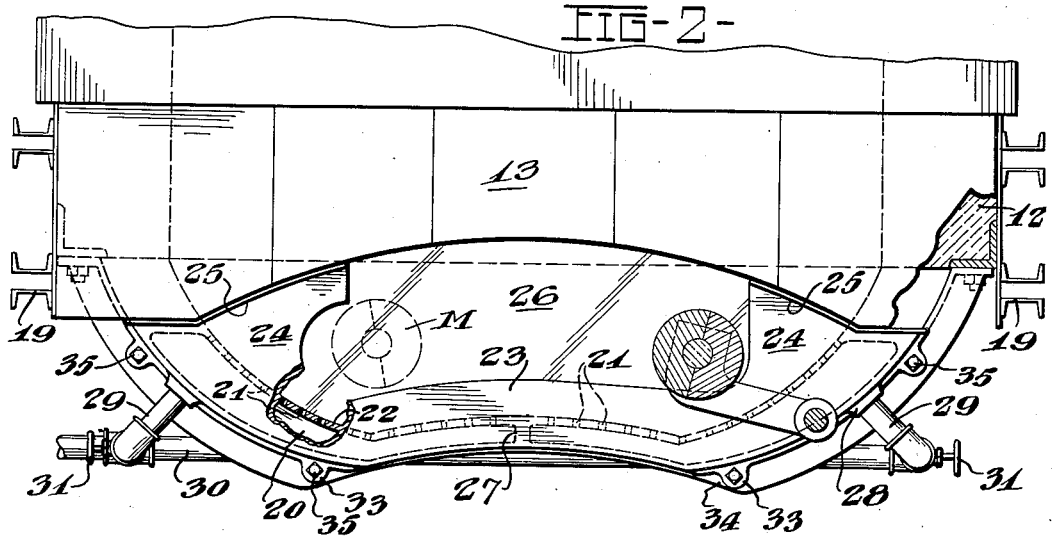
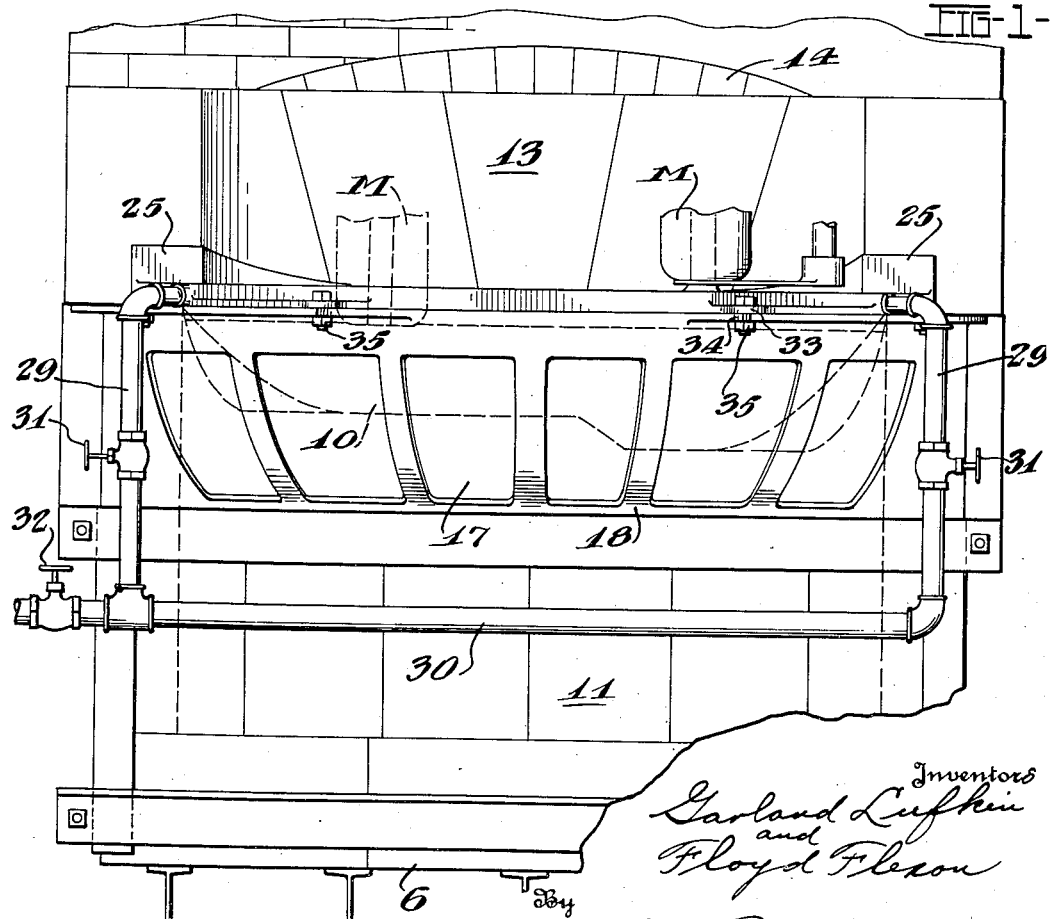

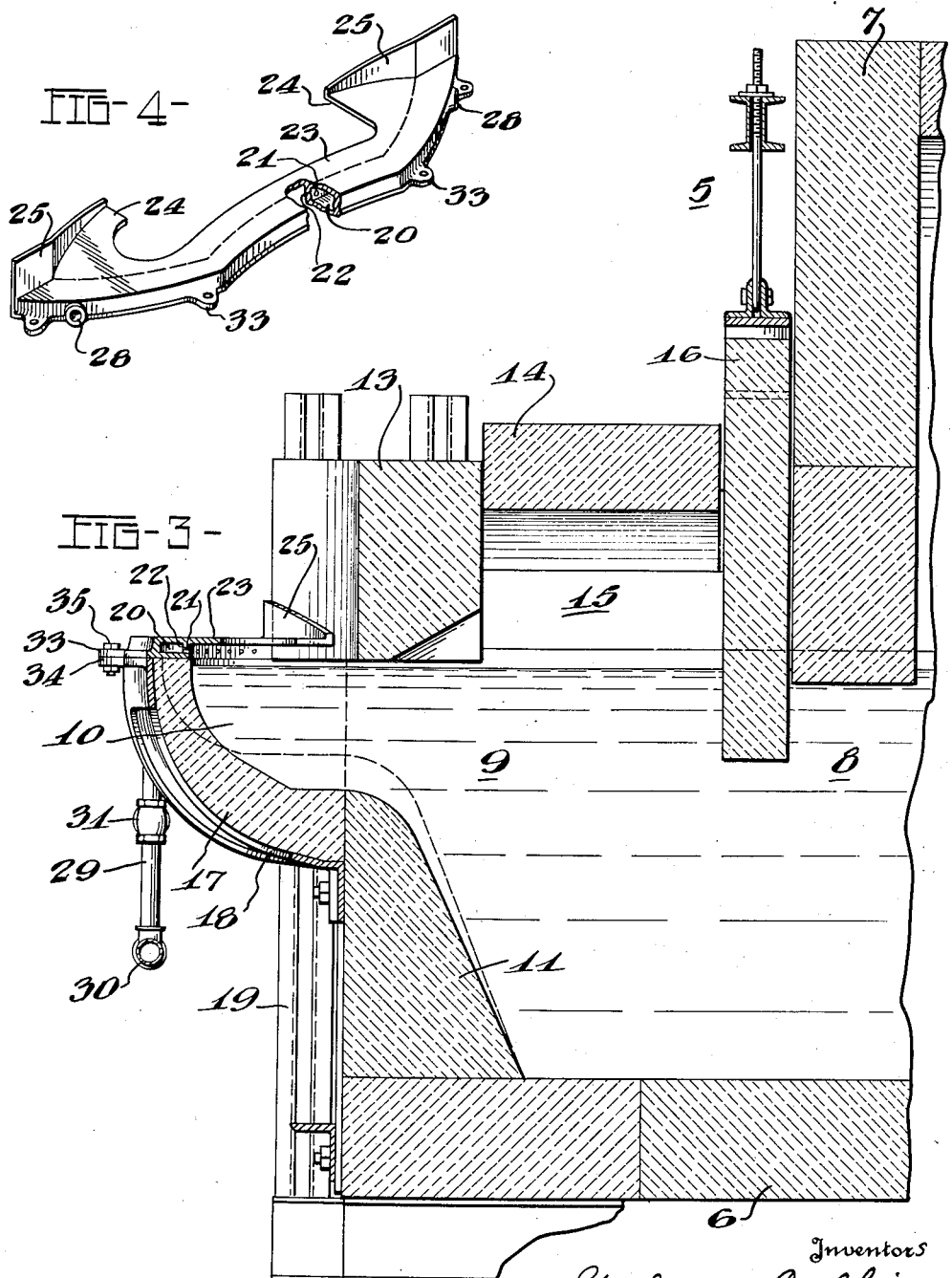

Patented Nov. 20, 1934

1,981,625

UNITED STATES PATENT OFFICE 1,981,625

GLASS MELTING FURNACE

Garland Lufkin, Bridgeton, N. J., and Floyd Flexon, Alton, Ill., assignors to Owens-Illinois Glass Company, a corporation of Ohio Application August 17, 1933, Serial No. 685,546

5 Claims. (Cl. 49—56)

The present invention relates to improvements in glass melting furnaces and more particularly to means for maintaining proper conditions of temperature and viscosity in the glass in a stationary forebay or trough directly connected to the furnace.

In providing for delivery of mold charges of molten glass to the molds of a suction type bottle blowing machine there has been developed a stationary gathering trough or forebay providing an exposed surface of molten glass into which the molds of the forming machine dip for the charging operation. This trough or forebay is directly connected to the furnace proper and in a sense forms an extension thereof. Circulation of the glass through the trough or forebay and particularly into the furnace proper, is essential to the maintenance of satisfactory temperature conditions at the point of gathering of the mold charges. While such circulation has proved to be entirely satisfactory in maintaining the desired temperature conditions in certain types of glass, it has, on the other hand, fallen short of attaining its purpose in other kinds of glass.

An object of the present invention is the provision of means for applying heat directly to the surface of the glass in the gathering trough or forebay.

Another object is the provision of means for concentrating the application of heat to the glass more or less in proximity to the rim of the forebay or trough.

A further object is the provision of a series of burners or their equivalent along the rim of the forebay to apply heat to the glass in the latter and a cover plate cooperating with the burners or the like in confining the heat and thereby increasing its effectiveness.

It is also an object to provide a burner and cover plate in the form of a single unit which may be readily removed and replaced.

Other objects will be in part apparent and in part pointed out hereinafter.

In the drawings:

Fig. 1 is a front elevational view.

Fig. 2 is a top plan view with parts broken away and shown in section.

Fig. 3 is a vertical transverse sectional view.

Fig. 4 is a detail perspective view of the burners and cover plate unit.

The present invention is illustrated in connection with a glass melting furnace 5 including a floor 6 and a vertical end wall 7, the latter having an outlet opening 8 leading to a furnace extension 9 which at its outer end is connected to the forebay 10 or trough. The furnace extension 9 includes a vertical front wall 11 and a pair of opposed side walls 12. A jack arch 13 and cover 14 or roof for a conditioning chamber 15 overlie the glass in the furnace extension. A vertically adjustable gate 16 arranged between said cover 14 and the vertical wall 7 of the furnace is operable to regulably control the level at which the glass leaves the main supply body. Thus the temperature of the glass entering the conditioning chamber and the forebay may be regulably controlled. The jack arch 13 defines the inner margin of the gathering area.

The forebay or trough 10 may well consist of refractory blocks 17 held in position by a frame 18 which in turn is bolted or otherwise secured to the main frame 19. This trough or forebay has its front wall curved and disposed concentric with the circular path of travel of the molds M of the forming machine (not shown) to thereby provide for clearance between the trough and certain parts of the machine.

Application of heat to the glass in the forebay 10 and confinement of this heat in intimate contact with the glass to a considerable degree is obtained by a structure substantially as follows. Preferably the structure is in the form of a single unit which facilitates handling and installation. The construction includes a manifold 20 in the form of a horizontal chamber shaped to conform to the curvature of the rim of the forebay upon which it rests. This manifold is provided with a longitudinal series of burner openings 21 or jets in its inner vertical wall 22. Preferably, these ports are inclined so that the projected flames will be more or less directly applied to the adjacent areas of the glass. A cover plate 23 formed integral with the manifold 20 extends horizontally inward over a portion of the glass in the forebay, said plate being substantially U-shape and including a pair of arms 24 and upstanding flanges 25 thereon which engage the adjacent vertical faces of the jack arch 13. Together the cover plate and jack arch provide a slot-like opening 26 through which the molds M may be dipped into the glass for the customary charging operation.

The operating efficiency of the apparatus is materially enhanced by dividing the manifold into two compartments and providing fuel supply lines individual thereto. To this end a vertical transverse wall 27 (Fig. 2) is arranged midway between the ends of the manifold. In proximity to the outer end of each compartment an inlet port 28 is formed in the outer vertical wall and connected to a fuel supply line 29, the latter in turn being connected to a main line 30. Valves 31 individual to the pipes 29 and a valve 32 in the main line regulate and control the supply of fuel to the manifold 20.

Ready removal and replacement of the unit is provided for through the following construction. Ears 33 formed integral with the manifold and cover plate and in the same plane with the lower wall of the former match up with ears 34 on the frame 18. Bolts 35 separably connect the ears and thereby hold the unit in operative position.

In operation, it is to be reasonably expected that the glass entering the forebay or trough at one end is in the proper condition for gathering. As indicated heretofore some difficulty has been experienced in maintaining the desired temperature and viscosity conditions in the glass even though circulation is present. Under these circumstances either or both compartments or sections of the manifold will be operated. Conditions may be such that heat should be applied to the entire surface or perhaps only to the surface at which the gathering operation actually takes place. The specific requirements will determine whether the entire manifold or only one portion thereof will be operated. The cover plate retards dissipation of the heat and assists materially in concentrating the application of heat to the desired areas.

Modifications may be resorted to within the spirit and scope of the appended claims.

What we claim is:

1. In combination, a glass melting furnace including a wall having an outlet opening through which the glass flows, a forebay to which the glass flows from said opening, said forebay providing an upwardly facing exposed surface of molten glass, a cover plate and jack arch cooperating to define a gathering area in the forebay, a burner comprising a manifold formed integral with the outer margin of the cover plate and shaped to generally conform with the contour of the outer margin of the forebay, said manifold having a plurality of inwardly facing ports, and means for supplying fuel to said manifold.

2. In combination, a glass melting furnace including a wall having an outlet opening through which the glass flows, a forebay to which the glass flows from said opening, said forebay providing an upwardly facing exposed surface of molten glass, a cover plate and jack arch cooperating to define a gathering area in the forebay, a burner comprising a manifold formed integral with the outer margin of the cover plate and shaped to generally conform with the contour of the outer margin of the forebay, said manifold having a plurality of inwardly facing ports, a partition extending transversely of the manifold and dividing it into two compartments, and means individual to said compartments for supplying fuel thereto.

3. In combination, a glass melting furnace including a wall having an outlet opening through which the glass flows, a forebay to which the glass flows from said opening, said forebay providing an upwardly facing exposed surface of molten glass and including a curved outer wall, a burner and cover plate unit including a manifold adapted to rest upon the wall of the forebay, said manifold having a series of inwardly facing ports, a horizontal cover plate projecting inwardly from the manifold just above the ports, means for supplying fuel to the manifold, and means for removably mounting the unit upon the forebay.

4. In combination, a forebay including an outer curved vertical wall, a jack arch overlying the forebay and defining the inner margin of a gathering area, a manifold shaped to conform with the contour of said wall and resting thereupon, said manifold having a plurality of inwardly facing burner openings, or ports, a cover plate projecting inwardly from the upper margin of the manifold and cooperating with the jack arch in defining the gathering area, means for removably securing the manifold and cover plate in operative position, and means for supplying fuel to the manifold.

5. In combination, a forebay including an outer curved vertical wall, a jack arch overlying the forebay and defining the inner margin of a gathering area, a manifold shaped to conform with the contour of said wall and resting thereupon, said manifold having a plurality of inwardly facing burner openings, or ports, a cover plate projecting inwardly from the upper margin of the manifold and cooperating with the jack arch in defining the gathering area, means for removably securing the manifold and cover plate in operative position, means for supplying fuel to the manifold, said means for securing the manifold and cover plate in operative position including a frame supporting the forebay, means for separably connecting the manifold to the frame, and arms at the opposite ends of said plate adapted to bear against the adjacent wall of the jack arch.

GARLAND LUFKIN.
FLOYD FLEXON.